United States Patent
Barth et al.

[11] Patent Number: 6,125,163
[45] Date of Patent: Sep. 26, 2000

[54] 3D IMAGE RECONSTRUCTION METHOD FOR USE IN COMPUTED TOMOGRAPHY

[75] Inventors: Karl Barth, Hoechstadt; Karl Wiesent, Erlangen, both of Germany

[73] Assignee: Siemens Aktiengesellschaft, Munich, Germany

[21] Appl. No.: 09/236,046

[22] Filed: Jan. 22, 1999

[30] Foreign Application Priority Data

Jan. 26, 1998 [DE] Germany ............................ 198 02 850

[51] Int. Cl.⁷ .................................................... A61B 6/03
[52] U.S. Cl. .................................. 378/4; 378/15; 378/901
[58] Field of Search ................................. 378/4, 15, 901; 382/131

[56] References Cited

U.S. PATENT DOCUMENTS 5,737,452  4/1998  Schiller .................................... 382/270

FOREIGN PATENT DOCUMENTS 0 242 909  10/1987  European Pat. Off. .

OTHER PUBLICATIONS

"Mathematical Foundations of Computed Tomography," Smith et al., Applied Optics, vol. 24, No. 3, Dec. 1, 1985, pp. 3950–3957.
"Practical Cone–Beam Algorithm," Feldkamp et al., J. Opt. Soc. Am., vol. 1, No. 6, Jun. 1984, pp. 612–619.
"Bildegebende Systeme für die medizinische Diagnostik," Morneburg, Ed. (1995), pp. 62–67, 110–116, 137–138.
"Experimentelle Prozessanalyse," Wernstedt (1989), pp. 132–144.

Primary Examiner—David V. Bruce
Attorney, Agent, or Firm—Hill & Simpson

[57] ABSTRACT

In an image reconstruction method for 3-d image reconstruction, particularly a fast reconstruction method for rotational angiography employing a pyramidal X-ray beam and a surface detector, image reconstruction is accomplished in a computer using an algorithm of the filtered back-projection type, and, outside the zero component, the components of the convolution kernel correspond to an exponential function. A particularly fast image reconstruction is achieved with such a convolution kernel by using recursive filtering.

6 Claims, 8 Drawing Sheets

Values of SL(I), EX(I) and Partial Sums for a = 0.

| | | | | |
|---|---|---|---|---|
| 1 | 0.33333 | 0.50000 | 0.33333 | 0.50000 |
| 2 | 0.06667 | 0.00000 | 0.40000 | 0.50000 |
| 3 | 0.02857 | 0.00000 | 0.42857 | 0.50000 |
| 4 | 0.01587 | 0.00000 | 0.44444 | 0.50000 |
| 5 | 0.01010 | 0.00000 | 0.45455 | 0.50000 |
| 6 | 0.00699 | 0.00000 | 0.46154 | 0.50000 |
| 7 | 0.00513 | 0.00000 | 0.46667 | 0.50000 |
| 8 | 0.00392 | 0.00000 | 0.47059 | 0.50000 |
| 9 | 0.00310 | 0.00000 | 0.47368 | 0.50000 |
| 10 | 0.00251 | 0.00000 | 0.47619 | 0.50000 |

Values of SL(I), EX(I) and Partial Sums for a = 0.250000

| | | | | |
|---|---|---|---|---|
| 1 | 0.33333 | 0.37500 | 0.33333 | 0.37500 |
| 2 | 0.06667 | 0.09375 | 0.40000 | 0.46875 |
| 3 | 0.02857 | 0.02344 | 0.42857 | 0.49219 |
| 4 | 0.01587 | 0.00586 | 0.44444 | 0.49805 |
| 5 | 0.01010 | 0.00146 | 0.45455 | 0.49951 |
| 6 | 0.00699 | 0.00037 | 0.46154 | 0.49988 |
| 7 | 0.00513 | 0.00009 | 0.46667 | 0.49997 |
| 8 | 0.00392 | 0.00002 | 0.47059 | 0.49999 |
| 9 | 0.00310 | 0.00001 | 0.47368 | 0.50000 |
| 10 | 0.00251 | 0.00000 | 0.47619 | 0.50000 |

Values of SL(I), EX(I) and Partial Sums for a = 0.500000

| I | SL(I) | EX(I) | Sum SL | Sum EX |
|---|---|---|---|---|
| 1 | 0.33333 | 0.25000 | 0.33333 | 0.25000 |
| 2 | 0.06667 | 0.12500 | 0.40000 | 0.37500 |
| 3 | 0.02857 | 0.06250 | 0.42857 | 0.43750 |
| 4 | 0.01587 | 0.03125 | 0.44444 | 0.46875 |
| 5 | 0.01010 | 0.01562 | 0.45455 | 0.48438 |
| 6 | 0.00699 | 0.00781 | 0.46154 | 0.49219 |
| 7 | 0.00513 | 0.00391 | 0.46667 | 0.49609 |
| 8 | 0.00392 | 0.00195 | 0.47059 | 0.49805 |
| 9 | 0.00310 | 0.00098 | 0.47368 | 0.49902 |
| 10 | 0.00251 | 0.00049 | 0.47619 | 0.49951 |

Values of SL(I), EX(I) and Partial Sums for a = 0.750000

| I | SL(I) | EX(I) | Sum SL | Sum EX |
|---|---|---|---|---|
| 1 | 0.33333 | 0.12500 | 0.33333 | 0.12500 |
| 2 | 0.06667 | 0.09375 | 0.40000 | 0.21875 |
| 3 | 0.02857 | 0.07031 | 0.42857 | 0.28906 |
| 4 | 0.01587 | 0.05273 | 0.44444 | 0.34180 |
| 5 | 0.01010 | 0.03955 | 0.45455 | 0.38135 |
| 6 | 0.00699 | 0.02966 | 0.46154 | 0.41101 |
| 7 | 0.00513 | 0.02225 | 0.46667 | 0.43326 |
| 8 | 0.00392 | 0.01669 | 0.47059 | 0.44994 |
| 9 | 0.00310 | 0.01251 | 0.47368 | 0.46246 |
| 10 | 0.00251 | 0.00939 | 0.47619 | 0.47184 |

Values of SL(I), EX(I) and Partial Sums for a = 1.000000

| I | SL(I) | EX(I) | Sum SL | Sum EX |
|---|---|---|---|---|
| 1 | 0.33333 | 0.00000 | 0.33333 | 0.00000 |
| 2 | 0.06667 | 0.00000 | 0.40000 | 0.00000 |
| 3 | 0.02857 | 0.00000 | 0.42857 | 0.00000 |
| 4 | 0.01587 | 0.00000 | 0.44444 | 0.00000 |
| 5 | 0.01010 | 0.00000 | 0.45455 | 0.00000 |
| 6 | 0.00699 | 0.00000 | 0.46154 | 0.00000 |
| 7 | 0.00513 | 0.00000 | 0.46667 | 0.00000 |
| 8 | 0.00392 | 0.00000 | 0.47059 | 0.00000 |
| 9 | 0.00310 | 0.00000 | 0.47368 | 0.00000 |
| 10 | 0.00251 | 0.00000 | 0.47619 | 0.00000 |

FIG 8B

3D IMAGE RECONSTRUCTION METHOD FOR USE IN COMPUTED TOMOGRAPHY

BACKGROUND OF THE INVENTION

1. Field of the Invention

The present invention is directed to a 3D image reconstruction method, and in particular to such a reconstruction method suitable for use in computed tomography.

2. Description of the Prior Art

Computed tomography is a widespread diagnostic tool in medical technology and for material research. For example, in a two-dimensional version, a slice of the subject is transirradiated from different positions (directions), proceeding from an X-ray source. The attenuated intensities are then measured behind the subject by a one-dimensional detector array and electrical signals corresponding thereto are fed to a computer in digital form. The distribution of the attenuation values in the transirradiated subject slice is then determined by means of a mathematical reconstruction method in the computer. The most popular method is the filtered back-projection. In its general form, it can be characterized by the steps of (1) preprocessing (weighting) of the measurement values. (2) convolution of the measurement values (filtering), (3) weighting of the convoluted data, (4) back-projection, and (5) scaling of the result.

Above all, the convolution and the back-projection are computationally intensive and time-critical.

If the convolution is forgone, a very blurred image results—known as a layergram—which does not reveal any details.

In general, the discrete convolution is described by the following formula:

$$y(n) = \sum_{1=-\infty}^{\infty} h(k)x(n-k)$$

where x(n) represents the sequence of the measurement values, h(n) is the convolution kernel, and the result y(n) is the sequence of the convolved (filtered) data.

A value y(n) of the convolution result is thus a weighted sum of all the input values x(n). Since, in practice, a measurement value set x(n) only consists of a finite number, generally N, values, the above formula reduces to a finite sum. Thus, in order to calculate an individual convolved value, N multiplications and N additions are generally necessary. If, in the convolution kernel h(n) which is used, only M components are different from zero (i.e., have non-zero values), and if M<N, then this leads to a further reduction of the computing outlay. Only M multiplications and additions, at the most, are then necessary for the calculation of a filtered value y(n).

The kernels utilized in computed tomography typically have full lengths; i.e., M=2N−1. The number of arithmetical operations is thus determined by N, the length of the measurement value fields x(n). These kernels are based on filter functions which are derived from ramp filters. The two most well-known are kernel based on the filter function formulated by Ramachandran and Lakshminarayanan, and the kernel based on the filter function formulated by Shepp and Logan.

Kernels utilized in CT typically have the following properties:

1. Symmetry, i.e. h(n)=h(−n). It is therefore sufficient to define only the central component h(0) and the right half h(n), for example, with n=1,2 . . .

2. Absence of zero-frequency component i.e., the sum over all kernel components is zero. This corresponds to the fact that in Fourier space, the ramp filter H(s) disappears at the zero point.

3. The central component h(0) is the single positive component; all others are negative or zero. Due to the final scaling of the total reconstruction result, the convolution kernel can normalized, without limiting its generality, such that the central component has the value h(0)=1. For n→∞, the absolute value of the kernel components goes toward zero.

The above described convolution in local space is equivalent to a component-by-component multiplication in Fourier space. After a certain kernel length, and given the utilization of kernels of full length, it can be numerically more effective to perform the filtering by multiplication in the Fourier space, i.e. to use the fast Fourier transformation (FFT) twice, and to use a very efficient multiplicative filtering in between:

FFT: $x(n) \rightarrow X(s)$ $Y(s)=X(s)*H(s)$

FFT (back): $Y(s) \rightarrow y(n)$

If the number M of the components h(n) which are different from zero is considerably lower than the length N of the measuring field, this leads to a reduction of the computing outlay only in the local space version, but not in the Fourier method.

A trend in medical technology is to survey and reconstruct an image of an entire volume of a subject in an optimally short time. This is achieved by the use of surface detectors instead of a one-dimensional detector array. A volume reconstruction from the measurement data obtained in a rotational angiography scan is also possible. FIG. 1 depicts the basic construction of such a known device. Such devices use the X-radiation significantly better than split-image tomography devices in which only a planar fan beam is emitted through a diaphragm. Such an angiography system (C-arm device) serves as exemplary embodiment for describing the background forming the basis of the invention.

The focus 1 of an X-ray source in the system shown in FIG. 1 travels around the subject 3 along an arc 2. An entire sub-volume of the subject 3 is transirradiated. The attenuated intensities behind the subject 3 are measured by a surface detector 4, usually an X-ray image intensifier. For this type of geometry, Feldkamp, et al., "Practical cone-beam algorithm;" *J. Opt. Soc. Am.*, Vol 1, 1984, pages 1612–619, describes an efficient approximative 3-D reconstruction algorithm. This algorithm is also of the filtered back-projection type and strongly resembles the abovementioned 2-D algorithm. Specifically, in the Feldkamp algorithm the filtering of the measurement values of the surface detector is not performed in two-dimensional fashion, but only by rows, i.e. one-dimensionally, as in the classical split-image tomography with a single-row detector. All of the above discussion regarding convolution applies to this algorithm. From the pyramidal X-ray beam which emanates from the X-ray source focus 1, only the fan beam 5 is shown, and on the surface detector 4, only the detector row 6 is shown, formed by a series of detector elements.

Typical data for such a C-arm device consist of about 50 projections each with 1024×1024 measurement values. In the Feldkamp algorithm, there are over 5000 one-dimensional convolutions over measurement value fields x(n) of the length N=1024. Given the utilization of normal CT kernels of full length, such as that based on the Shepp and Logan filter function, this is an enormous computing outlay which leads to prohibitively long computing times for many applications, such as use during surgical or treatment intervention, for example.

In practice, in many cases the subject 3 is wider than the detector; i.e., the VOI (Volume of Interest) to be reconstructed is in the beam path, but the entire subject cross-section is not. FIG. 2 illustrates this situation. The measuring field is referenced 7 here. The measurement value profiles then no longer have the shape as in FIG. 3, with a drop-off to zero at the margins, but instead they exhibit sharp cuts, as depicted in FIG. 4. These unnatural sharp cuts are error points in the measurement data x(n), which propagate to all the data y(n) given the utilization of expanded kernels. Theoretically, an exact reconstruction is not possible from such split projections. In practice, however, truly usable results are achieved. Basically two methods are known to approach this problem, these being extrapolation of the measurement values, and transition to local convolution kernels.

An extreme example of a local kernel is a type known as the Laplace kernel, which has a double differentiation:

h(0)=1 h(1)=h(−1)=−½ h(n)=0 otherwise

If this kernel is used, then the original subject f(x) is not reconstructed, but instead a modified distribution $\lambda f(x)$ is reconstructed. This has the same edges as f(x)—they are even exaggerated—but no longer gives information about the real value in homogenous regions. If the subject is a homogenous cylinder, for example, then the reconstructed values sag in the middle, as illustrated in FIG. 5a. Compared to the normal CT reconstruction, e.g. with the Shepp and Logan kernel, noise is transferred into the image center with higher intensity by the short Laplace kernel. To ameliorate this effect, smoothed versions of this differentiating core are also used, such as:

. . . ,0,−¼,−¼,1,−¼,−¼,0, . . . or

. . . ,0,−⅙,−⅓,1,−⅓,−⅙,0, . . .

If the convolution is forgone, then the aforementioned layergram with a profile as in FIG. 5b arises. For mathematical reasons, the layergram is referenced $\lambda^{-1}f(x)$. The omission of the convolution is equivalent to a convolution with a kernel known as the unit kernel, which is defined by h(0)=1 and h(n)=0 otherwise. The unit kernel does not have the typical characteristic of CT kernels that the sum over all components is zero. FIG. 5c depicts the exactly reconstructed profile of a homogenous cylinder.

A linear combination consisting of these two versions is designated as general $\lambda$-reconstruction. The mathematical theory goes back to Smith et al., "Mathematical Foundations of Computed Tomography";*Appl Optics,* Vol. 24, No. 23, Dec. 1, 1985, pages 3950–3957. The basic idea is that, in the weighted superposition in originally homogenous subject regions, the concave and the convex behavior of the two individual versions at least partially compensate, and the margin information is nevertheless retained.

Another possibility is to cut off a standard CT kernel of full length, such as kernel based on the Shepp and Logan filter function, symmetrically with respect to the zero point after L<N components, and to appropriately modify the remaining components such that the transition to zero occurs smoothly.

It should be noted that the goal of a reconstruction is not to achieve an optimally precise (as possible) computation of X-ray attenuation coefficients, but is to display diagnostically significant information for the physician. For this reason, different convolution kernels are used in medical computer tomography, dependent on the imaging task being addressed. The 3-D reconstruction from the data of a rotational angiography scan involves the displaying of fine, high-contrast vascular trees and vascular anomalies. FIG. 6 illustrates the boundary value field for a kernel optimization (region of the convolution optimization). The target parameters are, primarily, quality of result, and secondarily numerical efficiency.

Short kernels of the length M<<N have the properties of being local in their effect; i.e., possible points of error, as in spilt projections, remain local in their effect, and numerically efficient.

SUMMARY OF THE INVENTION

It is an object of the present invention is to optimize an image reconstruction method for computed tomography so that an acceleration of the convolution is achieved, and which allows a fast generation creation in a C-arm device with surface detectors.

The above object is achieved in accordance with the principles of the present invention in a method for three-dimensional image reconstruction from detector data from an X-ray device, particularly a computed tomography device, having an X-ray source and a surface radiation detector which are mounted so as to be displaceable around an examination subject for transirradiating a measuring field in which the subject is disposed from different directions, using a pyramidal or conical X-ray beam, and wherein image reconstruction takes place in a computer supplied with electrical signals from the detector corresponding to intensity values of incident radiation, the computer reconstructing an image of a three-dimensional volume of the subject by filtered back-projection employing convolution with a convolution kernel having components outside a center component which correspond to an exponential function.

Preferably, the filtering is realized by a recursive filter.

DESCRIPTION OF THE DRAWINGS

FIG. 8 illustrates the relationship between FIGS. 8A and 8B.

FIGS. 8A and 8B, in combination comprise a table showing computed values obtained using a Shepp-Logan convolution kernel, and an inventive convolution kernel, for comparison.

DESCRIPTION OF THE PREFERRED EMBODIMENTS

Figure 1:
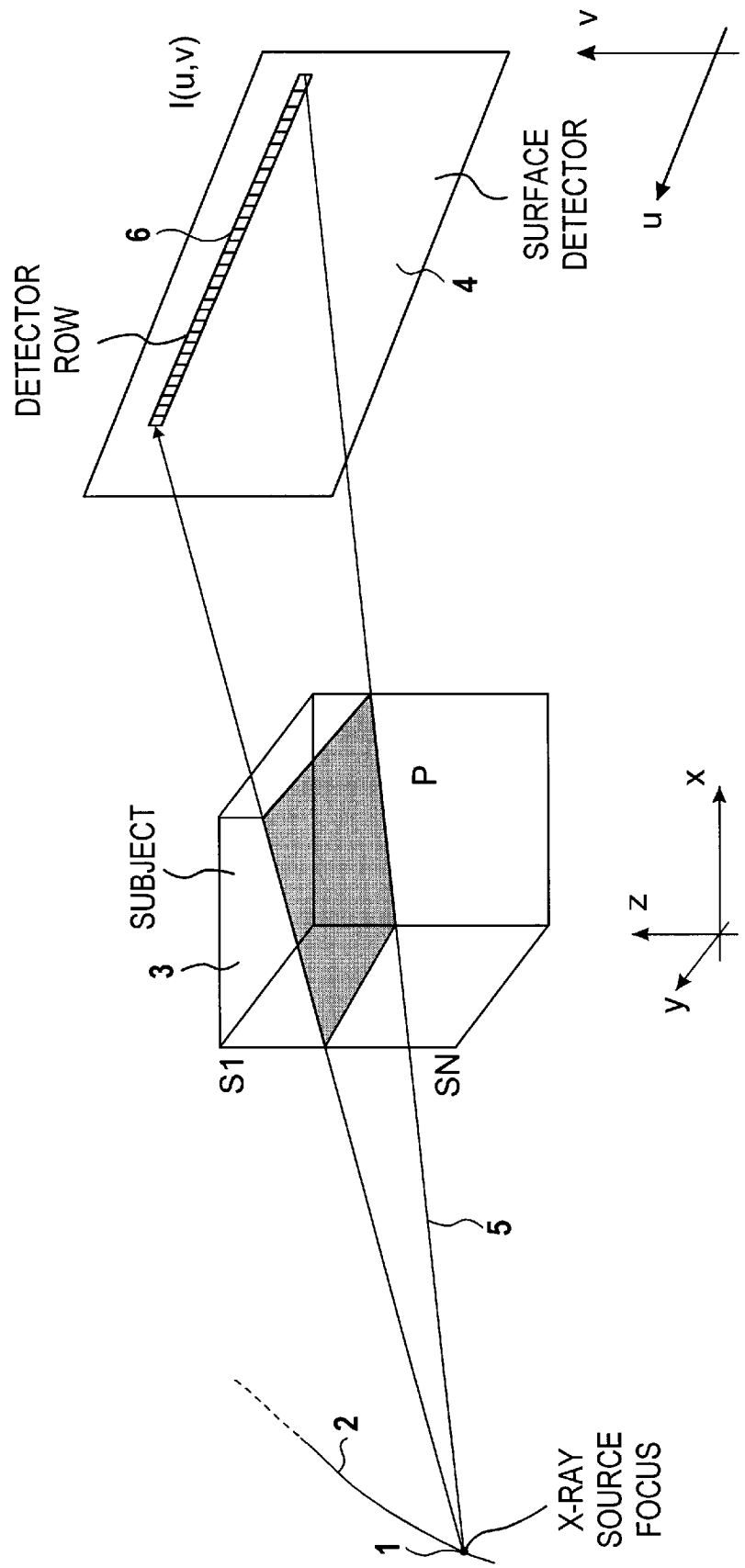
FIG. 1, as noted above, is a schematic illustration of the data-generating components used in a conventional computed tomography device.
Figure 2:
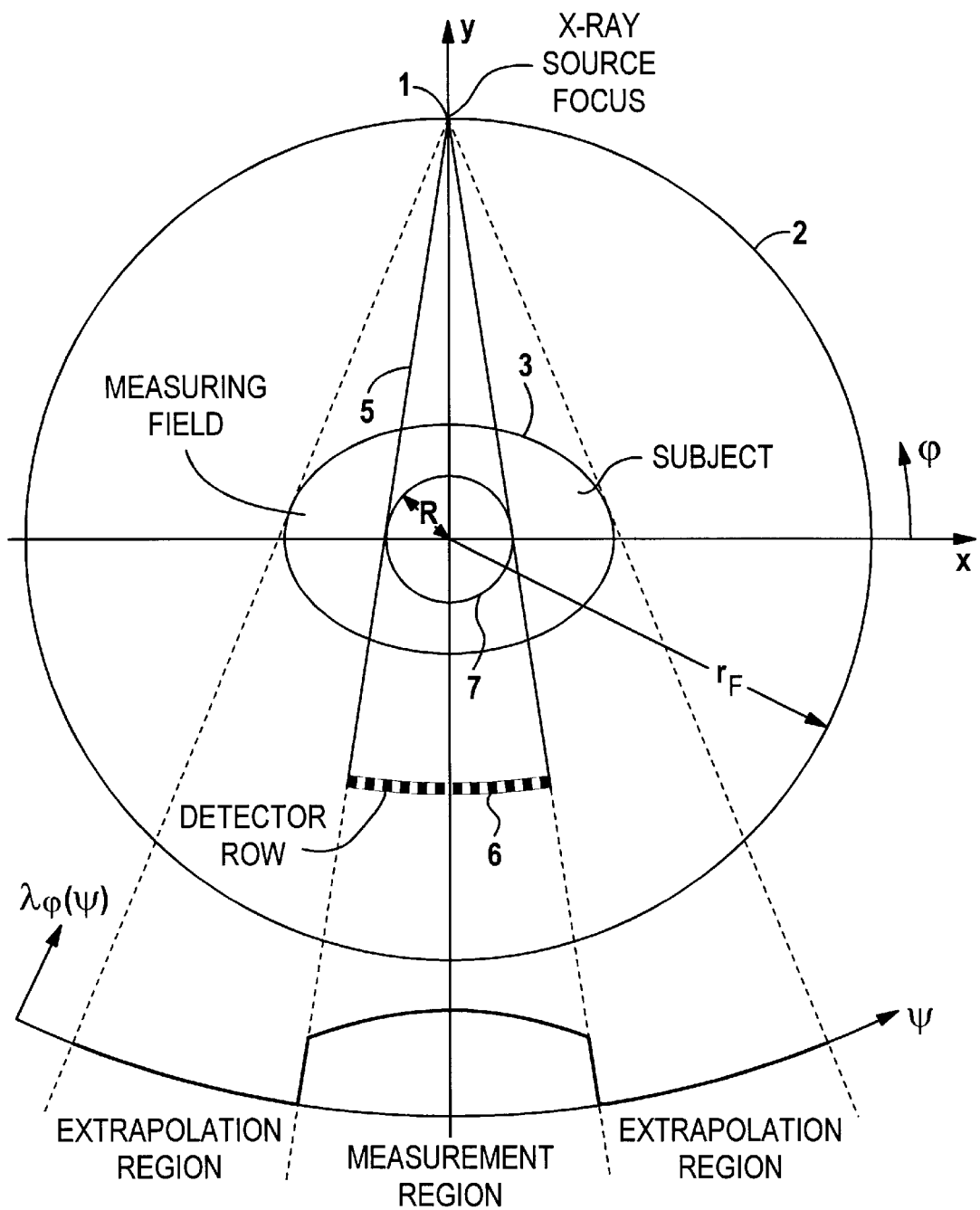
FIG. 2 schematically illustrates a section through a conventional computed tomography device showing the relationship of the radiation beam to an examination subject and the detector, and schematically illustrating the measurement region and the extrapolation regions on opposite sides thereof.
Figure 3:
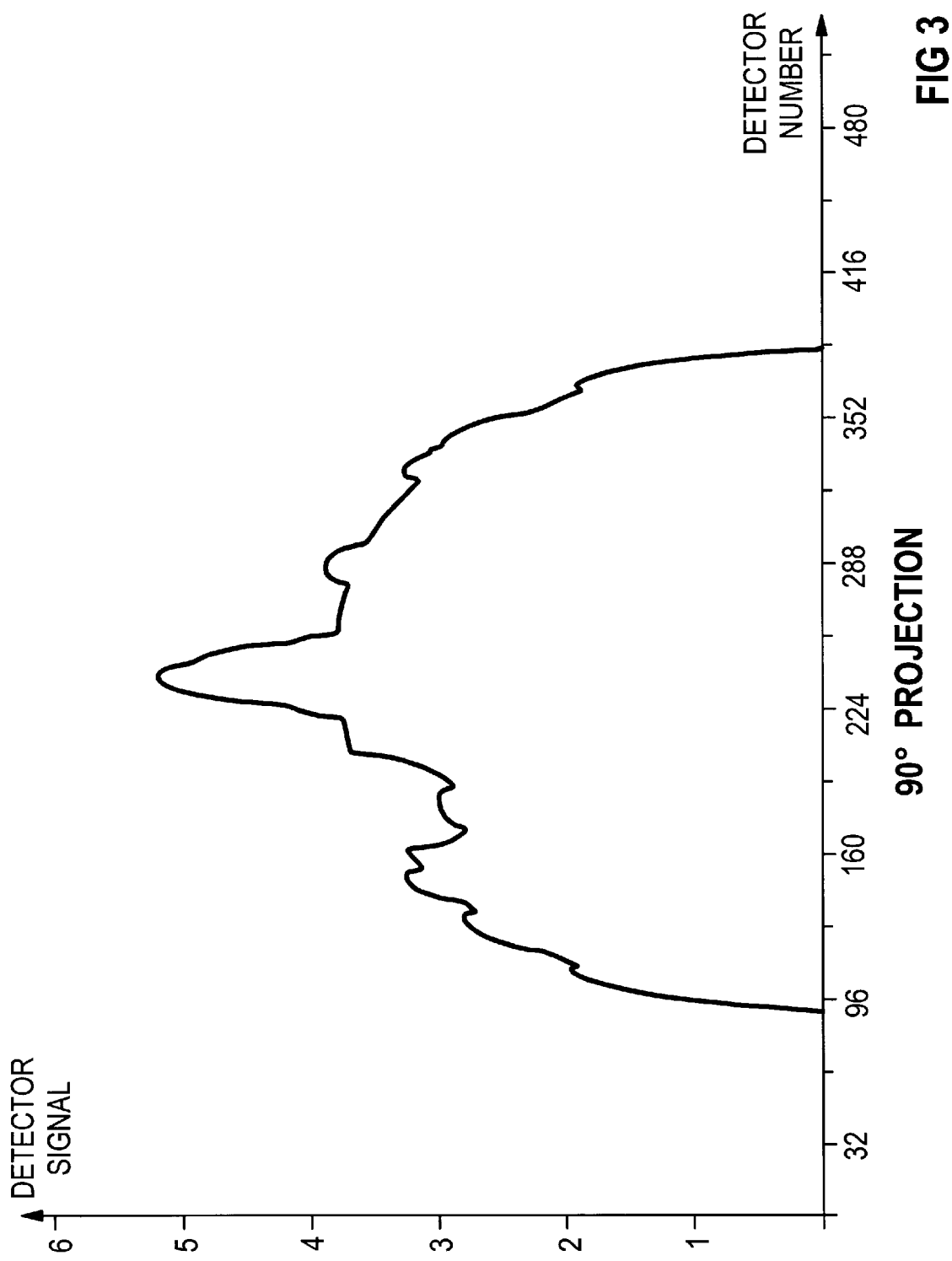
FIG. 3 illustrates a measurement profile obtained when the examination subject has a width approximately equaling, or within, the detector width.
Figure 4:
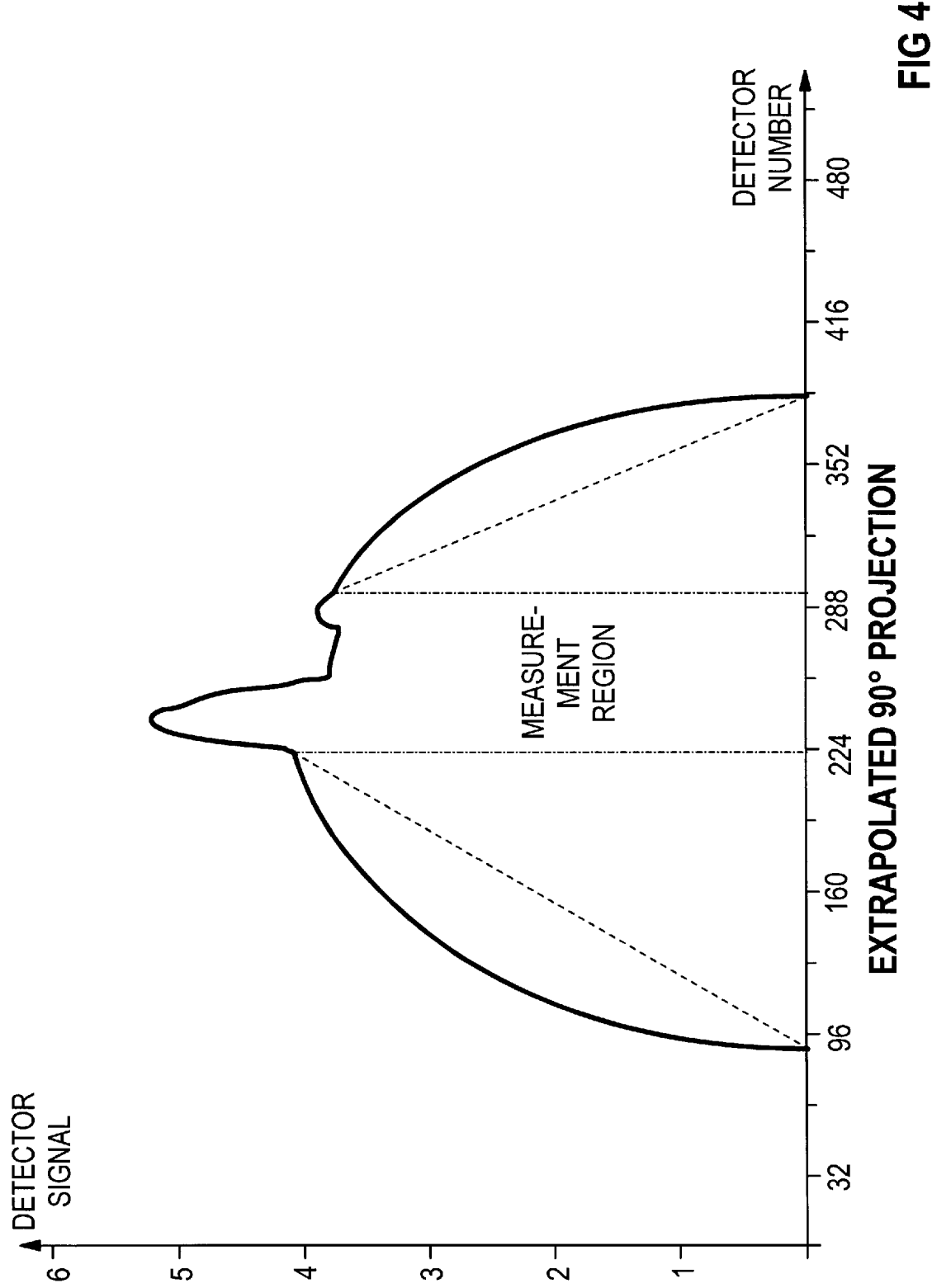
FIG. 4 illustrates a measurement profile as occurs in the embodiment shown in FIG. 2, wherein the examination subject is wider than the detector.
Figure 5A:
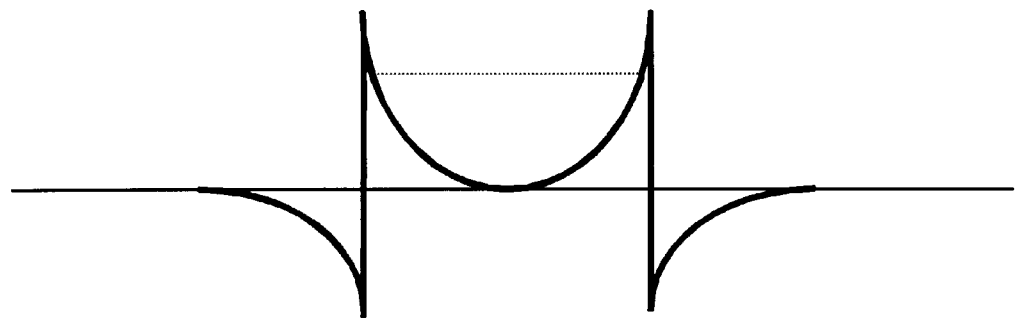
FIGS. 5a, 5b and 5c respectively illustrate reconstructed image values for a homogenous cylinder as an examination subject, with FIG. 5a representing values obtained using convolution, FIG. 5b representing values obtained without convolution (layergram), and FIG. 5c showing an exactly reconstructed profile.
Figure 5B:
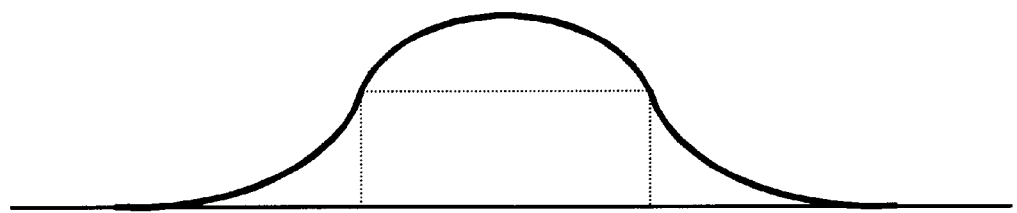
Figure 5C:
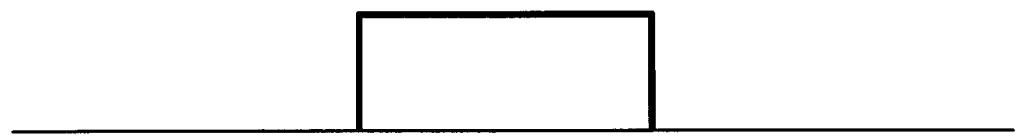
Figure 6:
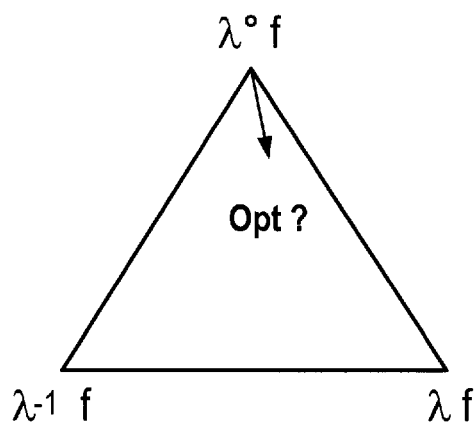
FIG. 6 schematically illustrates a boundary value field for a convolution kernel optimization.
Figure 7:
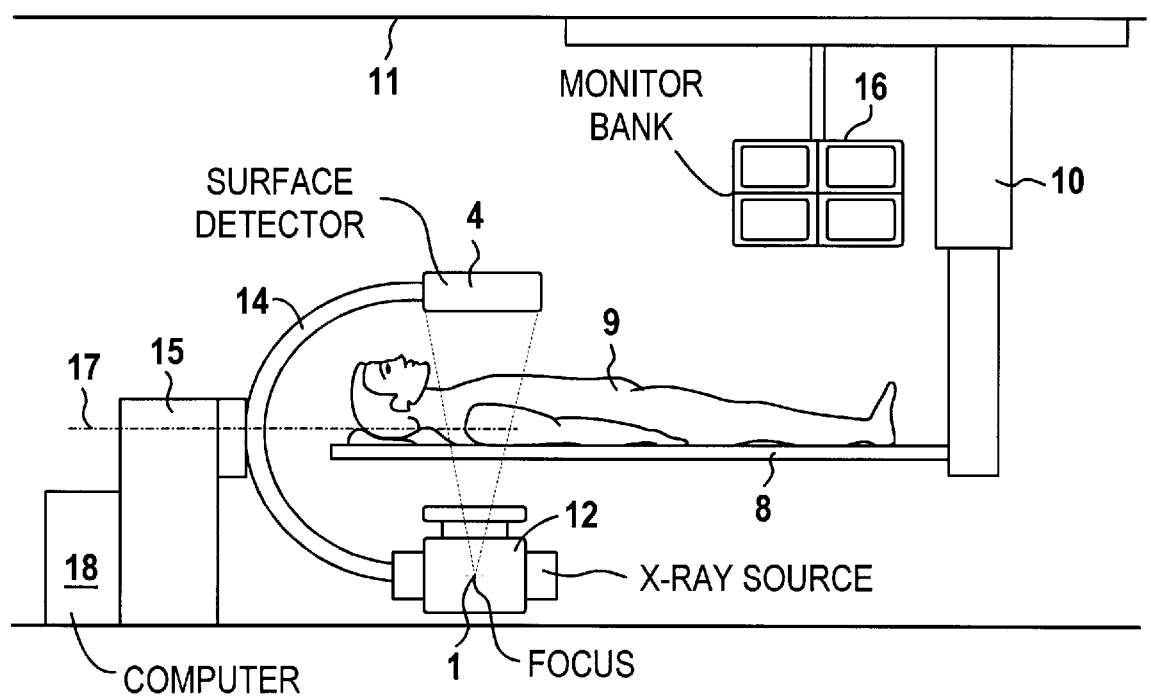
FIG. 7 is a side view of a computed tomography apparatus constructed and operating in accordance with the principles of the present invention.

FIG. 7 depicts an orientation table 8 on which a patient 9 lies and which is suspended at the ceiling 11 of the examination room with the aid of a stand 10. The orientation table 8 alternatively can be mounted independently of the actual C-arm device, for instance on the floor of the examination room. An X-ray source 12 and a surface detector 4 are provided for the preparation of X-ray images. The X-ray source 12 and the surface detector 4 are fastened to a C-arm 14, which is displaceably mounted at a base 15. The image reproduction occurs on a monitor bank 16. Volume data for the generation of three-dimensional images are obtained by rotating the X-ray source 12 and the surface detector 4 around the system axis 17.

The surface detector 4 is a matrix of detector elements, for example, which feed output electrical signals, which correspond to the individually measured incident radiation intensity, to a computer 18 in digitized form. The computer 18 reconstructs an image of a selected volume of the patient 9 using these signals or signals derived therefrom.

The inventive method accomplishes CT image reconstruction using convolution with a convolution kernel based on a filter having coefficients outside the central component which behave, according to the absolute value, like an exponential function.

An example of such a filter is a filter h(k) with the following coefficients:

h(0)=1
h(1)=−(1−a)/2
h(k)=h(1)*$a^{k-1}$
for k>1, and
h(k)=h(−k) for k<0

The parameter a can be selected freely from the interval [0,1]. It serves to optimize the result. For a<1, this filter has all the properties of a CT kernel mentioned in the introductory section above. In particular, the sum of all the coefficients is zero.

For a=0, the Laplace filter . . . 0,−½,1,−½,0, . . . , and thus a pure λ-reconstruction, results.

For the limit case a=1, the unit kernel . . . 0,1,0, . . . , and thus the layergram, results.

Figures 8, 8A:
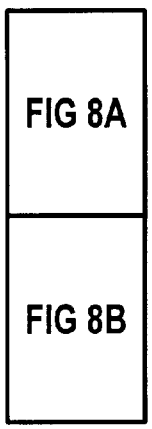

The filter does have the full length, but it falls exponentially, and thus ultimately very quickly, to zero. In contrast, the standard filter formulated by Shepp and Logan (see, for example, Heinz Morneburg (ed), *Bildgebende Systeme für de medizinische* Diagnostik, Publicis MCD Verlag, 1995) falls only with $1/k^2$. The exponential filter thus has a certain local character. By the variation of a, the rate at which the values in the central part decrease can be controlled, e.g. more rapidly than Shepp-Logan, or more slowly. The table according to FIGS. 8A and 8B lists the first ten values for different assignments of a, respectively. The first number of each row is the running index, followed by the absolute values of the respective components of a Shepp-Logan kernel (SL(l), and of the inventive exponential filter EX(l), as functions of the filter length l, for different values of the parameter a. The two latter columns contain the partial sums for the two kernels, i.e., the sums of the respective components from the first index to the current index. Due to the normalization of the central component to one and due to the symmetry, the convergence of the partial sums at 0.5 is equivalent to the zero-sum property.

In the reconstruction of vascular trees from patient data measured in rotational angiography, an image quality can be achieved with such exponential kernels which corresponds to or surpasses that of a Shepp and Logan kernel of full length.

Recursive filters are known in communication technology. They are by nature sharply asymmetrical in their effect. Symmetrization can be achieved, however, by performing in the filtering from left to right (increasing) and from right to left (decreasing), and averaging the two results are averaged.

The following demonstrates that the result of a convolution with the above defined exponential filter is also achieved when the result of an averaged recursive filtering of the first order is subtracted from the original data.

A recursive filter of the first order is defined by $$y(n)=a*y(n-1)+b*x(n)$$

This can be rewritten as $$y(n) = b * \sum_{i=0}^{n-1} a^i \cdot x(n-i)$$

If u(n) designates the result in the increasing direction and v(n) designates the result in the decreasing direction, then the overall result is $$u(n) = b * \sum_{i=0}^{n-1} a^i \cdot x(n-i)$$

$$v(n) = b * \sum_{i=0}^{N-n} a^i \cdot x(n+i)$$

$$w(n) = 2*x(n) - (u(n)+v(n)) = 2*(1-b) \cdot x(n) - b * \sum_{i>0} a^i \cdot (x(n+i) + x(n-i))$$

This is identical to the result of a normal convolution with the symmetrical kernel h, defined by h(0)=2·(1−b) and h(i)=−b·$a^i$.

If the central component is normalized to one, and b=1−a, then the filter class described above is present.

The recursive filtering is numerically very efficient. For example, to calculate a value u(n), only one multiplication and one addition are necessary. If the convolution with the expanded exponential kernel were performed as usual, then, as described above, for the calculation of a value y(n), N multiplications and additions would be necessary, but in the realization using recursive filtering, only two multiplications and three additions would be necessary.

The convolution with the expanded exponential kernel thus can be implemented with the same efficiency as the convolution with the short Laplace kernel.

In the exemplary embodiment of rotational angiography wherein N=1024, and, in accordance with the order of magnitude, the method disclosed herein results in acceleration of the convolution by a factor of 100.

In the described exemplary embodiment, the inventive method is realized by software in the computer 18. This applies particularly to the recursive filter. This can also be realized in terms of hardware, however.

The data acquisition is described in connection with FIG. 7, i.e. in the context of a C-arm device. A conventional computed tomography device with a gantry ring for the X-ray source and the surface detector can alternatively be used.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for three-dimensional image reconstruction from measurement data obtained from an examination subject, comprising the steps of:

providing an X-ray source and a surface radiation detector;

respectively disposing said X-ray source and said surface radiation detector on opposite sides of an examination subject and rotating said X-ray source and said surface radiation detector around said examination subject while irradiating said examination subject with X-rays from said X-ray source, to obtain measurement data corresponding to attenuated X-ray intensities at said surface radiation detector;

supplying said measurement data to a computer; and in said computer, reconstructing a three-dimensional image of a volume of said examination subject by filtered back-projection with convolution employing a convolution kernel having a central component and components outside of said central component corresponding to an exponential function.

2. A method as claimed in claim 1 wherein the step of irradiating said examination subject comprises irradiating an examination subject with a conical X-ray beam emitted by said X-ray source.

3. A method as claimed in claim 1 wherein the step of irradiating said examination subject comprises irradiating an examination subject with a pyramidal X-ray beam emitted by said X-ray source.

4. A method as claimed in claim 1 comprising subjecting said measurement data to recursive filtering in the filtered back-projection of said measurement data.

5. A method as claimed in claim 4 wherein the step of subjecting said measurement data to recursive filtering comprises subjecting said measurement data to recursive filtering of a first order from both sides to obtain two sets of recursively filtered data, and adding said two sets of recursively filtered data to obtain a data set which is double in size compared to said measurement data.

6. A method as claimed in claim 4 wherein the step of subjecting said measurement data to recursive filtering comprises recursively filtering said measurement data using a recursive filter of an arbitrary order.

* * * * *